United States Patent [19]

Foster

[11] Patent Number: 4,908,977
[45] Date of Patent: Mar. 20, 1990

[54] DEVICE FOR KILLING ARTHROPODS

[75] Inventor: James P. Foster, Chadds Ford, Pa.

[73] Assignee: E. I. Du Pont de Nemours and Company, Wilmington, Del.

[21] Appl. No.: 296,747

[22] Filed: Jan. 13, 1989

[51] Int. Cl.4 .............................................. A01M 1/20
[52] U.S. Cl. ........................................ 43/107; 43/114; 43/131; 43/122
[58] Field of Search ...................... 43/131, 132.1, 107, 43/114, 122, 117

[56] References Cited

U.S. PATENT DOCUMENTS

| | | | |
|---|---|---|---|
| 1,056,535 | 3/1913 | Grimes | 43/131 |
| 1,262,790 | 4/1918 | Hengstenberg | 43/131 |
| 1,573,278 | 8/1925 | Schlesinger | 43/131 |
| 2,176,345 | 10/1938 | Hurwitt | 43/131 |
| 2,234,500 | 3/1941 | Moore | 43/131 |
| 2,254,948 | 12/1939 | Kubalek | 43/131 |
| 2,956,366 | 12/1958 | Wiesman | 43/131 |
| 4,310,985 | 1/1982 | Foster et al. | 43/131 |
| 4,441,272 | 4/1984 | Bartz | 43/131 |
| 4,807,391 | 2/1989 | Bokiau | 43/131 |

Primary Examiner—Nicholas P. Godici
Assistant Examiner—Michael William Starkweather
Attorney, Agent, or Firm—James A. Costello

[57] ABSTRACT

An improved device for killing arthropods characterized by a sloped target area that contains a toxicant, the device being devoid of any containment vessel for dead arthropods.

20 Claims, 2 Drawing Sheets

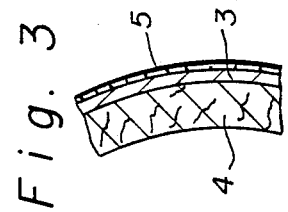
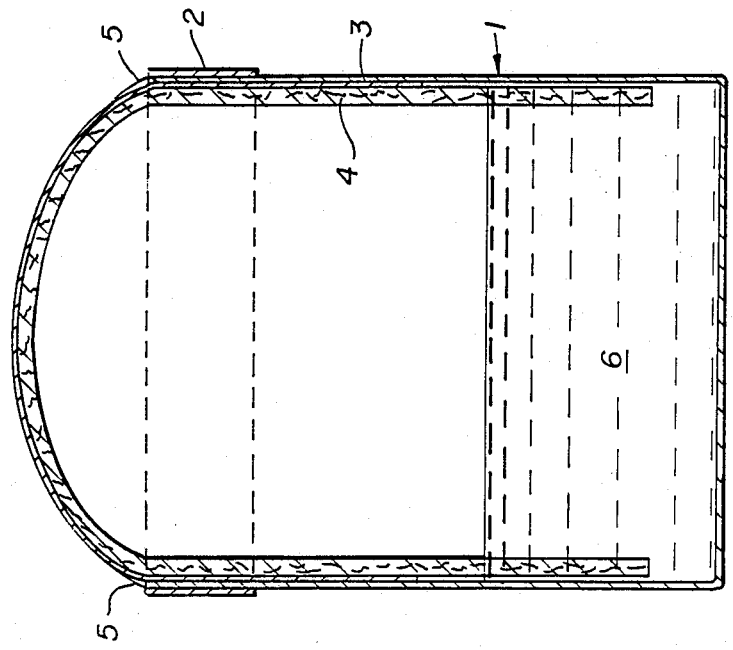
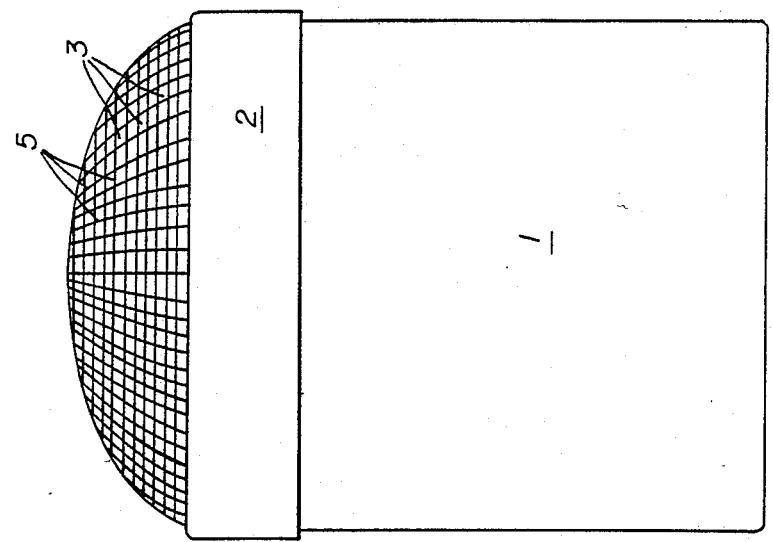

DEVICE FOR KILLING ARTHROPODS

BACKGROUND OF THE INVENTION

This invention concerns a device for killing arthropods especially flying insects and most especially flies. For the sake of brevity, the description provided hereafter will refer to the device primarily in its capacity to kill flies.

Certain 2-(nitromethylene)-1,3-thiazines and derivatives thereof are disclosed in U.S. Pats. 3,993,648 and 4,065,560 as having useful insecticidal activity against the house fly (Musca domestica). The insecticidal activity of tetrahydro-2-(nitromethylene)-2H-1,3-thiazine (TNMT) and other nitromethylene heterocycles are disclosed in Pesticides and Venom Neurotoxicity, Shankland et al., pages 153 to 169 (1978). The physical, chemical and insecticidal properties of these compounds are further disclosed in Advances in Pesticide Science, Part 2, Geissbuhler et al., pages 206 to 217, Symposia Papers from Fourth International Congress of Pesticide Chemistry, July, 1978.

There are myriad patent disclosures of fly traps going back at least to the mid-1800's. One of the more recent patents on this subject matter is U.S. 4,310,985 which discloses one embodiment of insect trap comprising:

(a) a target area of porous material comprising a sloped surface containing a dosage of tetrahydro-2-(nitromethylene)-2H-1,3-thiazine insecticide lethal to flies;

(b) a closely fitting or flush grill covering said target area but allowing contact by the flies thereon;

(c) a sloped supporting member for said target area comprising a solid sheet of rigid impermeable material shaped to conform with the shape of the target area and having its upper surface affixed to the target area so as to support and define the configuration of the target area;

(d) a hollow base section having a bottom and side or sides surrounding the bottom and perimeter of said sloped target area supporting member, the side or sides of said base section extending up a sufficient distance to form a cavity between the side or sides of the base and the target area supporting member, said cavity being of sufficient size for the containment and concealment of intoxicated flies; the base section being attached to the sloped supporting member such that a refillable reservoir for fluid storage or containment is formed in the hollow base section, said reservoir being defined on its top by the sloped supporting member and on its bottom by the bottom of the base section; and (e) a means of establishing fluid contact between the target area and refillable reservoir. The subject matter of the instant invention represents an improvement over the device disclosed in U.S. 4,310,985.

SUMMARY OF THE INVENTION

This invention concerns an improved device comprising a sloped and porous target area containing an effective dose of a 2-(nitromethylene)-1,3-thiazine toxicant, wherein the improvement comprises:

(i) the target area is fluid-permeable, self-supporting, and effective for killing arthropods,
(ii) the device contains an optional base section, one having no arthropod-containment cavity, the base section cooperating with the target area to continuously shed dead arthropods thereby preventing occlusion of the target area.

The device of this invention is particularly effective in killing flies in areas experiencing very high levels of fly populations, such as dairy barns, chicken houses or other confined animal quarters. Individual devices have been found effective in killing in excess of 25,000 flies per day.

The device may also contain an insect lure which is at least partially water-soluble or soluble in a water-miscible solvent. Other optional features comprise: a flush (preferred) or close-fitting grill over the target area; a refillable aqueous liquid-containing reservoir; an insect pheromone or other attractant; and an insect food. Additional details concerning TNMT physical and chemical properties, pheromones, and other attractants are provided after the Example.

Preferred features of this device comprise a self-supporting target area of about 100 cm$^2$ or greater whose surface has a downward slope of at least about 30°; use of an insect sex lure, which can be muscalure or other pheromone, releasable upon contact with water; and, finally, any fluid in the optional base reservoir is in contact with a material that wicks it to the surface target area. This invention also concerns a method for controlling insect infestations employing the devices of this invention.

Representative of the arthropods against which the devices of this invention have been found most effective are flies of the family Musca, including the house fly (Musca domestica) and the bush fly (Musca vertustissima), as well as flies of other families, such as the blow fly (Calliphora vomitoria), the fruit fly (Drosophila melanogaster), the stable fly (Stromoxys calcitrans) and the little house fly (Fannia spp).

The house fly is believed to activate its feeding mechanism after receiving appropriate stimuli via chemoreceptors believed to exist on its tarsi or feet. The feeding mechanism then involves a process wherein the fly lowers its proboscis to the surface upon which it has landed, expels saliva through the proboscis and finally sucks back whatever solution results. This process is believed to be virtually automatic when the fly lands on an appropriate surface. By this mechanism, a fly landing on the target area of the device described herein will ingest a lethal dose of toxicant and roll off the sloped target area leaving room for subsequent victims.

The preferred toxicant is tetrahydro-2-(nitromethylene)-2H-1,3-thiazine (TNMT) and agriculturally suitable salts thereof. Additional details on preparation of toxicants can be found in U.S. Pats. 3,993,648 and 4,065,560. The high water solubility of TNMT at room temperature promotes the fast takeup of a lethal dose by the flies when feeding and facilitates operation of the trap. The compound is nonvolatile in ordinary use, thereby releasing no harmful vapors to the atmosphere. Flies are readily attracted to feed on the device, since TNMT has little or no repellancy toward the insects. When the toxicant is used as described in the present invention, the devices are effective for several months so long as they are not exposed to inordinate amounts of direct sunlight. Finally, while TNMT is highly active against arthropods, it is much less so toward higher animal forms such as rats, rabbits and other mammals. This low mammalian toxicity contributes to utility of the device and its suitability for widespread use without undue danger to people or animals.

BRIEF DESCRIPTION OF THE DRAWINGS

FIG. 1 is a front elevation of the arthropod-killing device with optional base.

FIG. 2 is a vertical cross-sectional view of the device depicted in FIG. 1.

FIG. 3 is a fragmentary enlarged view of a cross-section of the downward-sloping lid of the device depicted in FIG. 2.

DETAILS OF THE INVENTION

Figure 4:
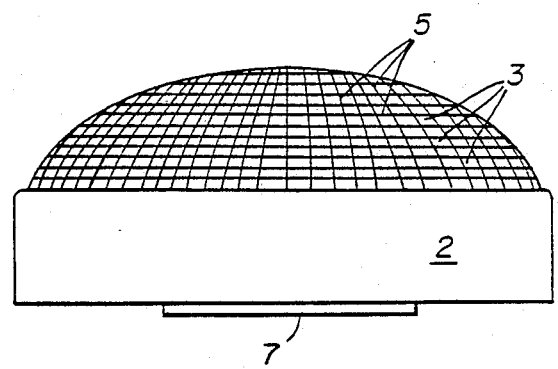
FIG. 4 is a front elevation of the device without optional base.

The following details can be understood most conveniently by reference to FIGS. 1 to 4. The target area of the device, 3, can be composed of any porous material such as felt, muslin, cloth, or blotter paper. The target is preferably white in dimly lit areas with a darkened background, or, black surrounded by white in brightly lit or light background locations. Maximum contrast between the target area and adjacent surroundings is most effective. The target area can be of any size but preferably its surface area is greater than 100 square centimeters. The surface should be sloped sufficiently downward so that the intoxicated flies roll off to provide continuous access to the target area by newly arriving flies. The target area can be curved or slanted or its sides can meet in a point. Its vertical cross-section can range from a triangular to a semi-circular or slightly rounded configuration. A target area with curved sides, e.g., having a semi-circular or semi-elliptical vertical cross-section forming an angle of at least about 30 degrees around its perimeter is especially preferred.

The target area can be covered with a closely-fitting or flush grill, 5. The grill should allow contact by the flies on the target area and therefore will contain openings of a size sufficient to permit the flies to land and feed on the target area surface. However, the main function of the grill is to prevent accidental contact of the target area by humans and domestic pets and the grill openings are suitably limited to a size which accomplishes this function. Furthermore, the thickness of the grill is suitably limited such that the depth of the openings will allow a fly standing on the highest portion of the grill to reach and ingest some of the toxicant on the target area surface and not interfere with the shedding of intoxicated flies. A grill with openings at least two millimeters on a side and one millimeter thick is preferred. The color of the grill is most preferably the same color as the target area.

The target area need not be covered with a grill to prevent accidental contact of the toxicant by humans and animals, although it is preferred. Alternatively, the target area can be embossed to form wells, grooves, channels, and the like, whereby the toxicant can be recessed to prevent accidental contact by humans and animals.

The perimeter of the target area is optionally surrounded by a hollow base section, 1, having a bottom and side or sides. Preferably, the side or sides of the base section will extend up to the level of the lowest portion of the target area. A bond or collar, 2, is conveniently employed between the base section and the target area to facilitate the shedding of dead arthropods from the target area. Optionally, the upper portion of the side or sides of the base section can bend inward to form a lip to provide additional support to the self-supporting target area.

The base section can be constructed from a variety of materials including paper and polymers such as polyolefins. The preferred materials are water-proof paper or other biodegradable materials. The base section is preferably of a shape which would allow the device as a whole to be free-standing on level surfaces. Its configuration is preferably box-shaped, rectangular or cylindrical, with a cylindrical configuration preferred. The base section can optionally include a means of suspending the device (not shown). The base section can be of the same or similar color as the target area or embossed with contrasting vertical lines and/or representations of standing flies since these are believed to aid in attracting flies to the device. The base section is attached to the sloped target area by means of bond, 2, such that a refillable fluid reservoir is formed. This fluid reservoir is defined on its top by the bottom of the target surface and on its bottom by the bottom of the base section.

There may extend upward from the bottom of the base section an interior wall or walls (not shown) of the same configuration as the lowermost perimeter of the target area such that the fluid in the reservoir is held without leaking. It is contemplated that when an interior wall is employed, it will act as the inside boundary for the wicking material that will be nestled between the inside boundary and the container, in contact with whatever fluid may be employed.

The manner in which the fluid reservoir is filled can vary. A resealable inlet or portal through which liquid is added may be provided for in a side or sides of the base section although this embodiment is not depicted in the drawings. The manner in which the inlet or portal is resealable is not critical; an item which prevents the fluid from evaporating or leaking out of said inlet or portal, such as a cork, stopper or detachable panel, is preferred. Water is the fluid of choice; the fluid should contain at least some proportion of water so that a solution of the water soluble insecticide results on the target area. Other fluids, such as glycerine can also be added. The amount of water added to the fluid reservoir can vary; preferably, the amount is 1 liter or greater and is at least sufficient to keep the surfaces of the target area moist.

A number of methods can be used to impregnate the porous surface of the target area with insecticide. For example, the target area material can be previously soaked in a solution of TNMT and allowed to dry, the surface of the target area can be painted with a solution of TNMT, or TNMT can be sprinkled on the target area. The insecticide is typically applied so as to be present on the target area in the amount of at least about 2.0 milligrams per square centimeter. At a minimum, the insecticide concentration on a target area will be sufficient to constitute a lethal dose when ingested by the fly. The device is periodically checked for liquid level and the fluid reservoir refilled as needed.

The device further contains a means of establishing fluid, 6, contact between the target area and the refillable fluid reservoir. This can be accomplished by any of a variety of conventional means which will maintain the moisture of the target area. Preferably, the target area material and/or a wicking material, 4, more preferably both, will extend downward into the fluid reservoir to a point below the fluid level present when liquid is added to the fluid reservoir, so as to draw the liquid up to the exposed surface of the target area. Examples of suitable wicking materials include felt, muslin, sponge, blotter paper or cloth; the term "wicking material" is intended to denote materials which wick whatever fluid or solution is present in said fluid reservoir.

The moisture resulting on the target area is believed to attract the flies to the device, induce their feeding response and/or promote the takeup of a poisonous amount of TNMT. Preferably, therefore, the fluid level in the wet trap is maintained so that the target area remains moist. The trap will, however, be useful for killing even if all fluid or moisture is allowed to evaporate, since the water soluble toxicant which is used is readily dissolved by the insect's saliva.

A further preferred means of attracting the flies is the use of a sex attractant (pheromone). Muscalure (cis-9-tricosene) is the sex attractant of choice for houseflies; the sex attractant can be contained in a gelatin capsule or other water-soluble container impermeable to the sex attractant. Addition of water dissolves the container, liberates the sex attractant and hence activates the device. In its most preferred mode, the device incorporates all of the above means of attracting the flies. Foodstuffs of choice include sugar or corn syrup. The foodstuff can be deposited on the target area as a glaze or sprinkled on the target area. Although it works dry as well, the most preferred trap embodiment will contain sugar on a moist target area, and a pheromone sex lure as well.

FIG. 4 depicts the device without a base section. The collar, 2, serves to hold the target area to a backing that serves as a substrate for affixing the device to a surface or for suspending it in areas of infestation. In FIG. 4, 7 is an-adhesive strip for affixing the device to floors, ceilings, walls, etc. When the device is employed without a base, it typically operates dry and is preferably used with a sweet coating such as sugar which serves as an additional attractant to encourage feeding. It is also contemplated that any one particular device can be designed with a removable target area (lid) that can alternatelY be employed with or without the base section depending on need. When the device is employed without the base, the latter can be stored until needed for coupling to the target area.

The following Example illustrates the invention.

EXAMPLE

Assembly of a paper model fly trap begins with one 128 ounce ice cream container (Fonda Group, Union, NJ 07083). The insert of the lid is removed and discarded. A one gallon plastic polyethylene bag (Castle Bag Company, 208-T Saturn Drive, Newark, DE) lines the container. A 950 ml polyethylene wide mouth bottle (VWR Scientific, P.0. Box 626, Bridgeport, NJ 08014) is used as the main support structure of the trap. A punch is used to make holes along the side and the bottom. This allows for water drainage. The bottle is placed in the container, open end up. A two quart plastic container (#8641A from Airlite Plastic Company, P.0. Box 649, Omaha, NE 68101) is placed upside down on the bottle. A hole one inch in diameter is cut in the bottom of the plastic container.

Diaper material (Proctor and Gamble, Cincinnati, OH, 45202) is used as the absorbent wicking material. The material is cut to a length of 14 inches and a width of 4 inches, with a 1 inch hole in the center. Two pieces of absorbent material are positioned at 90° angles to each other across the plastic container. The length is tucked between the ice cream container and the plastic container. A 10 inch diameter cellulose paper (Scott Paper Company, Philadelphia, PA 19113) is used as the toxicant vector. It is placed on top of the absorbent material. The center has a 1 inch diameter hole. A 10.5 inch diameter white shark skin filter paper, is placed on top of the cellulose paper. The shark skin filter paper has a central 1-inch diameter hole. This is the material which is dyed to produce the various colors tested. The rim of the lid of the ice cream container is placed on the container, stretching the shark skin filter paper across the surface. A gelatin capsule (Eli Lilly, Indianapolis, IN 46285) containing 100 microliters of muscalure is placed in the bottom of the device. The hanging device is constructed from a #105 rubber band (Plymouth Rubber Company, Canton, MS 02021) placed around the circumference of the ice cream container. Monofilament nylon line is cut into two 3-foot lengths. The lines cross at the bottom of the container and continue under the rubberband; finally, they are tied in a knot at the top.

Toxicant

Certain physical and chemical properties of nitromethylene heterocycles are known. For example, insecticidal activity of TNMT against the house fly (Musca domestica) was determined by directly spraying the insects in a wind tunnel. The compound has the formula:

$$\begin{array}{c} \diagup\!\!\!\diagdown \\ H-N \quad\quad S \\ \diagdown\!\!\!\diagup \\ NO_2 \quad H \end{array}$$

and a toxicity quotient of 161 vs. 100 for ethyl parathion. The physical properties of TNMT are as follows:

| | |
|---|---|
| Melting point, ° C. | 78 |
| Solubility, % weight/volume | Water, 20 |
| | Acetone, 7 |
| Hydrolytic Stability | 3 hours at pH 1.1 |
| (half life) | over 3 months at pH 7.0 |
| Photochemical Stability | Water, 10 minutes |
| (half life, 350 nm simulated | $CH_2Cl_2$, 1 minute |
| sunlight, 100 ppm) | |

Pheromones and Attractants

Pheromones or attractants may be classified as sex, food, or oviposition lures. Additional classifications or subclassifications include trail pheromones, aggregating and other pheromones. Broadly defined, a sex pheromone is an odor released by one member of the species which attracts the opposite member for the purpose of mating. The presence of sex pheromones has been demonstrated in most orders of insects and theY can be produced by the male or female of the species. In many cases, it is the female which produces the attractant. A large number of pheromones that are useful in the devices of this invention have been identified and created synthetically including those listed in Table 1.

TABLE 1

| Compounds | Insect |
|---|---|
| pentanoic acid | sugar beet wireworm *limoius californious* |

TABLE 1-continued

| Compounds | Insect |
| --- | --- |
| trans-3,cis-5-tetra-decadienoic acid | black carpet beetle *Attagenus megatoma* |
| cis-7-dodecenyl acetate | cabbage looper *Trichoplitha ni* |
| cis-8-dodecenyl acetate | oriental fruit moth *Grapholitha molesta* |
| cis-11-tetradecenyl acetate | red-banded leaf roller *Argyrotaenia velutinana* |
| cis-9,trans-12-tetra-decadienyl acetate and cis-9-tetra-decenyl acetate | southern armyworm *Prodenia eridenia* |
| cis-7,8-epoxy-2-methyloctadecane | gypsy moth *Porthetria dispar* |
| undecanal |  |
| undecan-1-al | greater wax moth *Galleria mellonella* |
| cis-2-isopropenyl-1-methylcyclo-butaneethanol | boll weevil *Anthonomus grandis* |
| 1,5-dimethyl-6,8-dioxabicyclo-3,2,1-octane | southern pine beetle *Dendrooctonus frontalis* |
| 2-methylheptadecane | tiger moths *Holomelina aurantiaca* complex |
| trimedlure | mediterranean fruit fly *Ceratitis Capitata* |
| cuelure | melon fly *Dacus Cucurbitae* |
| cis-9-tricosene | housefly *Musca domestica* |

The embodiments of the invention in which an exclusive property or privilege is claimed are defined as follows:

1. An improved device comprising a sloped and porous target area containing an effective dose of a 2-(nitro-methylene)-1,3-thiazine toxicant, wherein the imProvement comprises:
   (i) the target area is the top surface of the device, and further is fluid-permeable, self-supporting effective for killing arthropods,
   (ii) the device contains an optional base section, one having no arthropod-containment cavity, whereby the target area continuously sheds dead arthropods to prevent occlusion of the target area.

2. A device according to claim 1 wherein the toxicant is tetrahydro-2-(nitromethylene)-2H-1,3-thiazine.

3. A device according to claim 1 containing a sex attactant.

4. A device according to claim 1 containing an insect food.

5. A device according to claim 1 employing a grill over the target area.

6. A device according to claim 1 having a target area of about 100 cm$^2$ or greater.

7. A device according to claim 1 having a target area sloped down at an angle of at least 30°

8. A device according to claim 1 having a base section that comprises wicking material to wick to the target area any fluid contained therein.

9. A device according to claim 8 containing fluid in the base section.

10. A device according to claim 2 containing an insect food.

11. A device according to claim 10 wherein the insect food comprises sugar.

12. A device according to claim 2 employing a sex attractant.

13. A device according to claim 12 wherein the sex attractant is muscalure.

14. A device according to claim 13 having a target area of at least 100 cm$^2$ sloped down at an angle of at least 30°.

15. A device according to claim 14 having a base section that comprises wicking material to wick to the target area any fluid contained therein.

16. A device according to claim 15 containing fluid in the base section.

17. A device according to claim 1 having no base section, the device adapted for fixation to a surface or suspended.

18. A device according to claim 17 designed to be affixed to a surface.

19. A device according to claim 18 designed to be adhesively affixed to a surface.

20. A device according to claim 17 designed to be suspended.

* * * * *